W. W. DRAPER.
TOOL STOCK.
No. 48,763. Patented July 11, 1865.
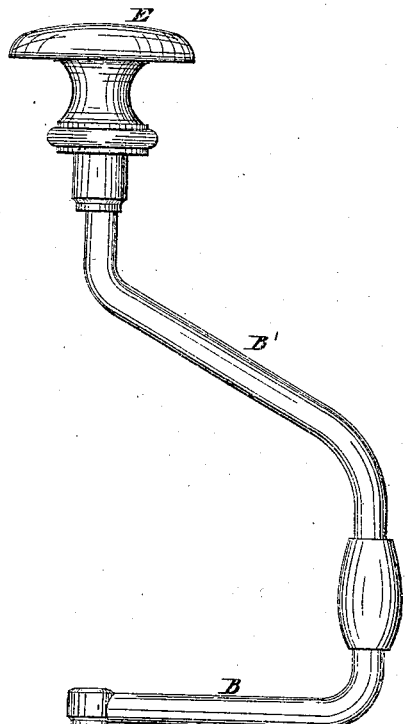
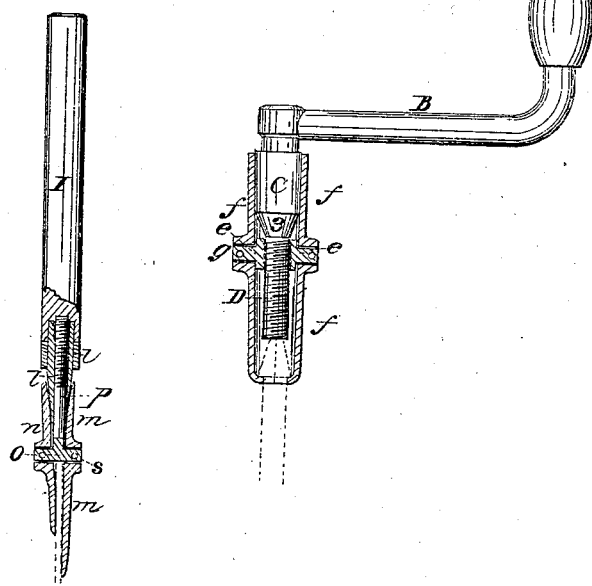
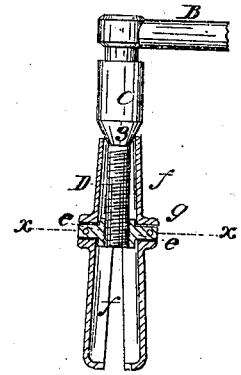
Witnesses:
Andrew DeLacy
W. H. Bishop
Inventor:
W. W. Draper
By his attorney,
J. N. McIntire

UNITED STATES PATENT OFFICE.

WM. W. DRAPER, OF GREENFIELD, MASSACHUSETTS, ASSIGNOR TO HIMSELF AND ALONZO PARKER.

IMPROVED TOOL-STOCK.

Specification forming part of Letters Patent No. 48,763, dated July 11, 1865.

*To all whom it may concern:*

Be it known that I, W. W. DRAPER, of Greenfield, of Franklin county, in the State of Massachusetts, have invented certain new and useful Improvements in Tool-Stocks; and I do hereby declare that the following is a full and exact description thereof, reference being had to the accompanying drawings, making part of this application.

My invention relates to that kind of stock or tool holder which is adapted to receive and hold various sorts and sizes of bits, files, &c., and has for its main object a simple and effective means of securely holding the shank of any kind of tool which it may be desired to operate with.

Previous to my invention various devices have been suggested to attain the objects aimed at by my invention; but in all with which I am familiar there is an unnecessary complication and a deficiency in the practicability of the devices.

My invention consists in the employment of vibratory griping-levers pivoted to a traveling nut or shoe, in combination with an annular wedge, the whole so arranged that by holding the tool and turning the stock, (or handle,) or vice versa, the shank of any tool inserted between the outer ends of the griping-levers will be griped and held fast to the stock or handle, all as hereinafter more fully explained; and my invention further consists in making the stock for bits of a peculiar form, to accommodate more readily the arm of the workman, as hereinafter more fully explained.

To enable those skilled in the art to make and use my invention, I will proceed to describe the same, referring by letters to the accompanying drawings, in which—

Figure 1 is a sectional elevation of a bit-stock embracing my invention. Fig. 2 is a partial sectional elevation of the same, showing a different condition of the moving parts. Fig. 3 is a cross-section at $xx$, Fig. 2; and Fig. 4 is a sectional elevation, showing a modification of my invention in its adaptation to a file-handle.

In Figs. 1, 2, 3 similar letters designate the same part.

B B' represent the bent portion of a brace or bit-stock, provided with a hand-piece in its hollow and a revolving hand or breast piece, E, in about the usual manner. This arm or frame B B' is formed or provided with a short stud or shaft, which varies in diameter during its length, a portion of it nearest the arm B being largest, as seen at C, thence tapering down, as shown at 3, to a less diameter, as shown at D, on which smaller portion is cut a screw-thread, on which works a nut or shoe, (having a female thread,) $e$. This nut $e$ is formed with projections, around which are pivoted by means of pins $y$ $y$ the griping-levers $ff$. The end of arbor D may be made with a hollow or concavity to accommodate the end of a bit, as seen at Figs. 1 and 3. The bit-shank is represented by red line at Fig. 1.

In Fig. 1 I have shown the parts in the relative position which they would occupy when holding fast onto the shank of a bit, which in Fig. 2 they are shown in the position which they would be placed in to admit of the extrication of the bit or other tool or of its insertion preparatory to fastening it into the stock.

The operation of a bit-stock made as just explained may be thus briefly described: Suppose the parts of the stock to be in the condition illustrated by Fig. 2, the shank of the bit (or other similar tool) is inserted into the hollow end of arbor D, as shown at Fig. 1, and the brace or stock and bit turned while the hand of the workman holds the griping-levers $f$ and its nut or shoe $e$. By this operation the rear or upper ends of levers $f$ are wedged apart by the passage between them of the tapering or cone-like portion 3 of the arbor C D until the said ends of levers $ff$ rest upon the cylindrical portion C of said arbor, as seen at Fig. 1, when the shank of the bit will be firmly secured to the stock.

It will be seen that by making the outer or lower ends of the levers $ff$ bent or claw-shaped, as shown, they are rendered capable of pulling upon the shoulder of the bit-shank and holding it home in the socket in arbor D.

At Fig. 4 I have shown a modification of my invention as adapted to a file-handle. In this figure it will be seen that, in lieu of having the shoe or piece to which the clamping-levers $m$ $m$ are attached arranged to travel in the arbor $p$ and the latter formed with an annular wedge, the annular wedge $l$ is fast in the handie I, and the arbor $p$, having the shoe $o$ fast to it, moves with a screw motion within said wedge or cam $l$; but it will be understood that the mode of operation involved in this modification is substantially the same as that involved in the bit-stock shown in the other figures. The clamping-levers $m$ $m$, turning on their pivots $s$, are wedged apart at their rear ends by the cone $l$ and gripe the file (shown in red) between their opposite ends. By making the arm or frame of the brace in the peculiar form shown—that is, bent at about right angles, as usual, near the shank, thence at about right angles again, and then bent at an obtuse angle, as shown—the portion B' will much more readily clear the arm of the workman and enable him to use the brace with much greater convenience.

Having fully described my invention, and not wishing to limit myself to the precise forms of parts or details of construction, what I claim as new, and desire to secure by Letters Patent, is—

1. The combination of the screw-shank, constructed as specified, and conical wedge with the inclosed nut and clasping-jaws $f$, the whole arranged to operate as described, for the purpose set forth.

2. The peculiar shape of the arm-piece B B', as shown, for the purpose set forth.

In testimony whereof I have hereunto set my hand and seal.

WM. W. DRAPER. [L. S.]

In presence of—
MOSES EDDY,
ARTHUR E. FRARY.